United States Patent [19]

Lal et al.

[11] 4,341,667

[45] Jul. 27, 1982

[54] COMPOSITION AND METHOD OF IMPROVING THE UNVULCANIZED PROPERTIES OF BLENDS CONTAINING RECLAIMED RUBBER

[75] Inventors: Joginder Lal, Akron; Sandra J. Walters, Stow, both of Ohio

[73] Assignee: The Goodyear Tire & Rubber Company, Akron, Ohio

[21] Appl. No.: 161,830

[22] Filed: Jun. 23, 1980

Related U.S. Application Data

[60] Continuation-in-part of Ser. No. 42,275, May 24, 1979, Pat. No. 4,243,561, which is a division of Ser. No. 779,382, Mar. 21, 1977, Pat. No. 4,198,324.

[51] Int. Cl.$^3$ .................... B29H 19/00; C08L 17/00
[52] U.S. Cl. .................... 525/211; 525/215; 525/232; 525/233; 525/240; 525/237; 521/41
[58] Field of Search ............ 260/2.3; 525/211, 232, 525/240

[56] References Cited

U.S. PATENT DOCUMENTS

| | | | |
|---|---|---|---|
| 3,386,925 | 6/1968 | Dillhoefer | 260/2.3 |
| 4,028,288 | 6/1977 | Turner | 260/2.3 |
| 4,104,205 | 8/1978 | Novotny et al. | 260/2.3 |
| 4,243,561 | 1/1981 | Lal et al. | 260/4 R |

*Primary Examiner*—Carman J. Seccuro
*Attorney, Agent, or Firm*—Daniel J. Hudak; J. Y. Clowney

[57] ABSTRACT

The green strength of compositions containing elastomers and/or up to 100 percent of reclaimed rubber is improved by the addition of crystalline or semi-crystalline butene polymers selected from the group consisting of polybutene and interpolymers made from 1-butene with at least one monomer selected from the group consisting of alpha-olefins, non-conjugated dienes, and non-conjugated polyenes. Although reclaimed rubbers are utilized, an unexpected increase in green strength of an unvulcanized blend is obtained. The reclaimed rubbers utilized in the blend may be those which have been devulcanized by mechanical energy, heat, and/or chemical agents. Additionally and preferably, the rubbers may be reclaimed through the use of microwave energy.

Additionally, the unvulcanized properties of compositions containing 100 percent of scrap rubber which has been reclaimed using microwave energy are significantly improved by adding crystalline or semi-crystalline alpha-olefin polymers, such as polyethylene or polypropylene. Unexpected improvements in solvent resistance and molding properties of the uncured blends are also achieved.

12 Claims, No Drawings

COMPOSITION AND METHOD OF IMPROVING THE UNVULCANIZED PROPERTIES OF BLENDS CONTAINING RECLAIMED RUBBER

CROSS-REFERENCE

This application is a continuation-in-part of our pending U.S. patent application bearing U.S. Ser. No. 042,275, filed May 24, 1979 now U.S. Pat. No. 4,243,561 for "Composition and Method of Improving the Green Strength of Unvulcanized Elastomers," which in turn is a division of our patent application bearing Ser. No. 779,382, filed Mar. 21, 1977 now U.S. Pat. No. 4,198,324 for "Composition and Method of Improving the Green Strength of Unvulcanized Elastomers."

BACKGROUND ART

The present invention relates to improved green strength of unvulcanized elastomeric compositions containing reclaimed rubber therein. More specifically, the present invention relates to the improvement of green strength by adding semi-crystalline butene polymers or interpolymers thereof to elastomeric compositions containing reclaimed rubber made by devulcanizing vulcanized scrap rubber using mechanical energy, heat, and/or chemical agents, or microwave agents.

The present invention also relates to blends of reclaimed rubber, devulcanized by microwave energy, with crystalline or semi-crystalline polyolefins such as polyethylene or polypropylene. These uncured blends are easily molded into articles which have good resistance to attack by aromatic solvents, aliphatic solvents, and fuel-alcohol mixtures.

A major deficiency of reclaimed rubber as well as reclaimed rubber-elastomer blends is lack of sufficient green strength required for satisfactory fabrication of complex products such as tires and industrial goods. The abatement of this deficiency would greatly facilitate the partial or complete replacement of more costly virgin elastomers with reclaimed scrap (that is, commonly discarded) rubber.

The term "green strength" while being commonly employed and generally understood by persons skilled in the rubber industry is, nevertheless, a difficult property to precisely define. Basically, it is that property of a polymer, common in natural rubber, which contributes the proper building characteristics where multiple components are employed and which result in little or no relative movement of the assembled components subsequent to assembly and prior to initiation of the curing operation. "Tack" is also an important property but the lack of tack is usually readily overcome by the addition of well known and conventional tackifying agents. Green strength, that is adequate mechanical strength for fabricating operations necessarily carried out prior to vulcanization is lacking in many elastomers. That is, the stress at break is low. Thus, unvulcanized strips or other forms of many elastomers often pull apart in a taffy-like manner during building operations. Although numerous additives and compounds have been utilized in association with various elastomers and particularly synthetic cis-1,4-polyisoprene, adequate improvement in green strength has generally not been accomplished.

Green strength has generally been measured by stress/strain curves of unvulcanized compounds. Usually, the performance of a green compound is based upon the ultimate or breaking tensile. Improvement indicates improved green strength.

Among the various additive compounds or agents which have been utilized to improve green strength of synthetic elastomers are numerous nitroso compounds as set forth in U.S. Pat. Nos. 2,457,331; 2,447,015; 2,518,576; 2,526,504; 2,540,596; 2,690,780; and 3,093,614. Additionally, various dioxime compounds have been utilized such as those set forth in U.S. Pat. Nos. 2,969,341; 3,037,954; 3,160,595; and British Pat. No. 896,300. Yet another class of additives or compounds is the diesters of 5-norbornene as set forth in U.S. Pat. Nos. 3,817,883 and 3,843,613.

As set forth in Canadian Pat. No. 870,053, minor amounts of trans-1,4-polyisoprene are used to improve green strength. However, no suggestion is made as to the use of polyolefins, as to the use of elastomer-reclaim rubber blends, or as to the use of reclaimed rubber.

In an article by Kumbhani, "Butyl Rubber—a Useful Elastomer Modifier for Polyolefins," Polysar Limited, 1977, data is set forth substantiating the title. No mention is made of reclaimed rubbers, improved green strength, or the like.

A Romanian article was published in *Materials Plastics* No. 10 (11), 604,607 (1973) entitled "INFLUENCE OF ADDITIONS OF POLYBUTYLENE WITH DIFFERENT MOLECULAR WEIGHTS ON THE PROPERTIES OF COMPOSITIONS OF CIS-POLYISOPRENE SYNTHETIC RUBBER" and prepared by B. Mehr and T. Volintiru. This article discloses the use of polybutylene which is mixed with synthetic or natural rubber to give increases in various properties. As set forth on page 2 of the translation of the article, the molecular weight must be low and cannot exceed 10,000 since otherwise a mixture with a synthetic rubber cannot be obtained. The article does set forth data which shows that various cured physical properties are improved such as the increase in resistance to repeated bending and increased ozone resistance. However, as plainly evident by the table set forth on page 3 of the translation, no appreciable increase in uncured tensile or rupture strength is obtained when polybutene is utilized. In fact, the bottom of page 3 of the translation clearly states that in comparison with low pressure polyethylene utilized as a mixture, the polybutylenes do not improve the green strength of cis-polyisoprene synthetic rubber. Thus, this article is not pertinent.

Another U.S. patent, namely U.S. Pat. No. 3,909,463 assigned to Allied Chemical Corporation, relates to the preparation of graft copolymers wherein a synthetic rubber is grafted onto an olefin polymer backbone such as polypropylene and polybutylene whereby a composition is formed which is free of substantial amounts of crosslinked rubber. The amount of olefin polymer utilized is from 40 percent to about 99 percent by weight. Additionally, a bifunctional phenol-aldehyde condensate is utilized in forming the graft copolymer. The grafted copolymer formed appears to be a high impact resin. Thus, this article is also not relevant to the present invention.

The present application is readily distinquished from the above reference in that a physical blend is formed as opposed to a chemical reaction for forming a graft copolymer, a rubber compound is formed as opposed to a high impact resin, low amounts of polybutene are utilized in comparison to the high amount contained in the graft copolymer and no bifunctional phenol-aldehyde condensate is utilized whatsoever in the present invention.

U.S. Pat. No. 3,654,197 to Seifert relates to molded substances, having improved cold resistance and resistance to stress cracking, which are formed from mixtures of partially crystalline, partially amorphous, polymers together with small but significant amounts of sulfur-vulcanizable unsaturated rubber and sulfur. However, this patent relates to essentially thermoplastics which are crosslinked and contain very low amounts of unsaturated rubber, that is up to 20 percent maximum. No suggestion of using reclaimed rubber is made.

In contrast, applicant's invention relates to elastomeric blends containing a minimum of 40 parts by weight of elastomer including the incorporation of reclaimed rubber therein, with such blends having improved green strength. Thus, the Seifert reference is inapplicable.

It is noted that U.S. Pat. Nos. 3,123,583 to Howard; 3,965,055 to Schichman; 3,701,702 to Schichman; 4,005,054 to Bonnefon; British Pat. No. 946,224 to Burke; British Pat. No. 1,120,572 to Asahi and the article by Mehr and Volintiru, "*Materials Plastics*" No. 10 (11), 604–607 (1973); were cited as merely being of interest in the parent application since they generally fail to show applicant's improved green strength elastomers. Moreover, these references generally fail to suggest the use of reclaimed rubber.

DISCLOSURE OF INVENTION

It is therefore an object of the present invention to improve the green strength of elastomer compositions containing reclaimed rubber.

It is another object of the present invention to improve the green strength of elastomer compositions containing reclaimed rubber, as above, wherein the amount of reclaimed rubber can range up to 100 percent of the elastomer content.

It is a further object of the present invention to improve the green strength of elastomer compositions containing reclaimed rubber, as above, wherein said composition contains a semi-crystalline butene polymer.

It is still another object of the present invention to improve the green strength of elastomer compositions containing reclaimed rubber, as above, wherein the butene polymer is selected from the group consisting of a homopolymer of 1-butene, and interpolymers made from a 1-butene monomer with at least one monomer selected from the group consisting of alpha-olefins having from 2 to 16 carbon atoms, non-conjugated dienes of the general formula:

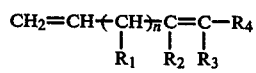

where $R_1$, $R_2$, and $R_3$ is a hydrogen, a lower alkyl group containing up to four carbon atoms, or an aryl group, $R_4$ is an aryl group or a lower alkyl group containing up to nine carbon atoms and n is an integer having values of from 1 through 6, and wherein the said $R_1$'s in the

may be similar or dissimilar, and nonconjugated alpha-, omega-polyenes having from 6 to 36 carbon atoms which may or may not contain internal unsaturation wherein butene in the interpolymers comprises from 99.9 to 65 mole percent of the total monomers charged.

It is still a further object of the present invention to improve the green strength of elastomer compositions containing reclaimed rubber, as above, wherein said reclaimed rubber is derived from vulcanized rubbers which have been devulcanized through the application of mechanical energy, heat, chemical agents, or microwave radiation.

It is yet a further object of the present invention to improve the green strength of elastomer compositions containing reclaimed rubber, as above, wherein microwave energy has been utilized to reclaim rubbers having inherent polarity, for example, polychloroprene, nitrile rubber, etc., or rubbers inherently lacking polarity but in which polarity has been previously introduced as the result of some material compounded into the rubber, for example, carbon black.

It is yet another object of the present invention to improve the green strength of elastomer compositions containing reclaimed rubber, as above, wherein said reclaimed rubber is polychloroprene, nitrile rubber, butyl rubber, chlorobutyl rubber, bromobutyl rubber, nitrile rubber-poly(vinyl chloride) blends, EPDM, polyalkenylenes, natural or synthetic cis-1,4-polyisoprene, rubber made from conjugated dienes having from 4 to 10 carbon atoms, rubbers made by interpolymerization of said conjugated dienes among themselves or with monomers selected from the group consisting of vinyl substituted aromatic hydrocarbon compounds having from 8 to 12 carbon atoms.

It is yet another object of the present invention to improve the green strength of elastomer compositions containing reclaimed rubber, as above, wherein said reclaimed rubber is made from hoses, belts, tubes, tires, tire treads, tire carcasses, and the like.

It is yet another object of the present invention to provide a reclaimed rubber blend which has good unvulcanized (green) solvent resistance and molding properties.

It is yet another object of the present invention to provide a reclaimed rubber blend, wherein reclaimed rubber obtained from microwave devulcanization of scrap rubber is blended with semicrystalline or crystalline polyolefins such as polyethylene or polypropylene.

It is yet another object of the present invention to provide a reclaimed rubber blend as in the preceding paragraph, wherein the amount of reclaimed rubber ranges from about 80 parts by weight to about 40 parts by weight and the amount of said polyolefin ranges from about 20 parts by weight to about 60 parts by weight.

It is yet another object of the present invention to provide a reclaimed rubber blend, as above, wherein said blend can be made during a post-reclaiming process.

These and other objects of the present invention will become apparent from the following specification which describes in detail the embodiments without attempting to discuss all of the modifications in which the invention might be embodied.

Generally, a prevulcanization process for producing a reclaimed rubber blend, comprises:
improving the green strength of a reclaimed rubber-elastomer blend by obtaining from about 5 parts by weight to about 100 parts by weight of reclaimed rubber, said reclaimed rubber produced by devulcanizing scrap rubber with mechanical energy, heat and/or chemical agents, or microwave energy, said reclaimed rubber selected from the group consisting of polychloroprene, chlorobutyl rubber, bromobutyl rubber, butyl rubber, nitrile rubber, nitrile rubber-poly(vinyl chloride) blends, EPDM, natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms, and combinations thereof;

adding to said reclaimed rubber from about 95 parts by weight to about 0 parts by weight of an elastomer, said elastomer selected from the group consisting of natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms, and combinations thereof, the total amount of said reclaimed rubber and said elastomer being 100 parts by weight;

adding to said reclaimed rubber and said elastomer a semi-crystalline butene polymer having a number average molecular weight of from about 30,000 to about 500,000, the amount of said butene polymer ranging from about 2 parts by weight to about 30 parts by weight per 100 parts by weight of said elastomer-reclaimed rubber mixture, said butene polymer selected from the group consisting of polybutene and interpolymers made from 1-butene monomer and at least one monomer selected from the group consisting of (a) alpha-olefins having 2 through 16 carbon atoms, (b) non-conjugated dienes having the formula:

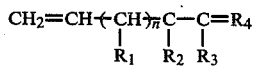

where $R_1$, $R_2$ and $R_3$ is a hydrogen, a lower alkyl group containing from 1 to 4 carbon atoms, or an aryl group; where $R_4$ is an aryl group or a lower alkyl group containing from 1 to 9 carbon atoms, and n is an integer having a value of from 1 to 6, and wherein the said $R_1$'s in the

group may be similar or dissimilar, (c) non-conjugated alpha-, omega-polyenes having from 6 to 36 carbon atoms which may or may not contain internal unsaturation, and (d) combinations thereof, wherein butene in said interpolymers comprises from 99.9 to 65 mole percent of the total monomers, and mixing said elastomer, said reclaimed rubber and said butene polymer to produce an elastomer-reclaimed rubber blend having improved green strength before vulcanization.

Generally, an elastomeric composition prevulcanization blend having improved green strength, comprises:

from about 5 parts by weight to about 100 parts by weight of reclaimed rubber, said reclaimed rubber which has been devulcanized using mechanical energy, heat and/or chemical agents, or microwave energy, said reclaimed rubber selected from the group consisting of polychloroprene, chlorobutyl rubber, bromobutyl rubber, butyl rubber, EPDM, nitrile rubber, nitrile rubber-poly(vinyl chloride) blends, natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms, and combinations thereof;

from about 95 parts by weight to about 0 parts by weight of an elastomer, said elastomer selected from the group consisting of natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms; and combinations thereof, the total amount by weight of said reclaimed rubber and said elastomer being 100 parts by weight;

from about 2 to about 30 parts by weight of a butene polymer per 100 parts by weight of said elastomer-reclaimed rubber mixture, said butene polymer selected from the group consisting of polybutene and interpolymers made from 1-butene monomer and at least one monomer selected from the group consisting of (a) alpha-olefins having 2 through 16 carbon atoms and (b) non-conjugated dienes having the formula:

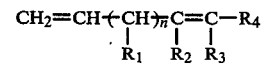

wherein $R_1$, $R_2$ and $R_3$ is a hydrogen, a lower alkyl group containing from 1 to 4 carbon atoms, or an aryl group, where $R_4$ is an aryl group or a lower alkyl group containing from 1 to 9 carbon atoms, and n is an integer having a value of from 1 to 6, and wherein the said $R_1$'s in the

group may be similar or dissimilar; and (c) non-conjugated alpha-, omega-polyenes having from 6 to 36 carbon atoms which may or may not contain internal unsaturation, and (d) combinations thereof, wherein butene in said interpolymers comprises from 99.9 to 65 mole percent of the total monomers.

Generally, a reclaimed rubber-polyolefin blend composition comprises:

from about 20 parts by weight to about 60 parts by weight of a crystalline or semi-crystalline polyolefin, said polyolefin selected from the group consisting of polyethylene, polypropylene, copolymers of ethylene with about 1 percent to about 20 percent by weight of an alpha-olefin having from 3 to 10 carbon atoms, copolymers of propylene with about 1 percent to about 20 percent by weight of ethylene or alpha-olefins having from 4 to 10 carbon atoms, a copolymer of ethylene with about 1 percent to about 15 percent by weight of vinyl acetate, and combinations thereof;

from about 40 parts by weight to about 80 parts by weight of reclaimed rubber, said reclaimed rubber made from vulcanized rubber which has been devulcanized by microwave energy, the total amount of said polyolefin and said reclaimed rubber being 100 parts by weight, said reclaimed rubber selected from the group consisting of polychloroprene, chlorobutyl rubber, bromobutyl rubber, nitrile rubber, nitrile rubber-poly(vinyl chloride) blends, butyl rubber, EPDM, natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms; and combinations thereof.

Generally, a process for producing a reclaimed rubber-polyolefin blend, comprises:

obtaining from about 20 parts by weight to about 60 parts by weight of a crystalline or semi-crystalline polyolefin, said polyolefin selected from the group consisting of polyethylene, polypropylene, copolymers of ethylene with from about 1 percent to about 20 percent by weight of an alpha-olefin having from 3 to 10 carbon atoms, copolymers of propylene with about 1 percent to about 20 percent by weight of ethylene or alpha-olefins having from 4 to 10 carbon atoms, a copolymer of ethylene with about 1 percent to about 15 percent by weight of vinyl acetate, and combinations thereof;

adding and mixing with said polyolefin about 40 parts by weight to about 80 parts by weight of reclaimed rubber, said reclaimed rubber which has been produced by devulcanizing scrap vulcanized rubber using microwave energy, the total amount of said polyolefin and said reclaimed rubber being 100 parts by weight, said reclaimed rubber selected from the group consisting of polychloroprene, chlorobutyl rubber, bromobutyl rubber, nitrile rubber, nitrile rubber-poly(vinyl chloride) blends, butyl rubber, EPDM, polyalkenylenes, natural or synthetic cis-1,4-polyisoprene, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms; and combinations thereof.

BEST MODE FOR CARRYING OUT THE INVENTION

According to the concepts of the present invention, improved green strength of elastomers containing reclaimed rubber, that is elastomer-reclaimed rubber blends or solely reclaimed rubber, is obtained through the addition of semi-crystalline butene polymers. The method of addition of the butene polymers to an elastomer-reclaimed rubber mixture may be any conventional method such as by the addition of the desired amount of butene polymer to the synthetic rubber during compounding. For example, the butene polymer can be added to an elastomer solution and dried prior to any reclaimed rubber addition in a Banbury, mill, etc. On the other hand, the butene polymers may be added to the reclaimed rubber before the addition of the elastomer. Of course, any other blending or mixing method may be utilized since the only requirement is that the butene polymer of the present invention be dispersed within the elastomer-reclaimed rubber blend.

The mechanism of green strength improvement of the elastomer-reclaimed rubber blend with butene polymers is not established. Presumably, the butene polymers improve the green strength by providing sites of crystallinity in the blend. In general, the crystalline polymers for imparting green strength improvement possess a certain desirable melting temperature. If the melting temperature is too high, it will not blend easily without decomposing the elastomer component. A desirable melting temperature of the butene polymers of the present invention is generally in the range of 55° C. to about 125° C. with a preferred range being from about 70° C. to about 100° C.

The semi-crystalline butene polymers are obtained by polymerizing 1-butene alone to form polybutene or by forming interpolymers from a 1-butene monomer and at least one monomer selected from the group consisting of (a) alpha-olefins having 2 through 16 carbon atoms, (b) non-conjugated dienes having the general formula:

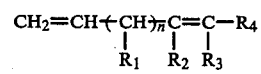

where $R_1$, $R_2$, and $R_3$ is a hydrogen, a lower alkyl group containing from 1 to 4 carbon atoms, or an aryl group; where $R_4$ is an aryl group or a lower alkyl group containing from 1 to 9 carbon atoms, and n is an integer having a value of from 1 to 6, and wherein the said $R_1$'s in the

group may be similar or dissimilar; and (c) non-conjugated alpha-, omega-polyenes having from 6 to 36 carbon atoms which may or may not contain internal unsaturation, and combinations thereof. The butene interpolymers contain from 99.9 to 65 mole percent, and preferably from 95 to 70 mole percent of butene.

Examples of suitable alpha-olefins which can be utilized for copolymerization with 1-butene include ethylene, propylene, 1-pentene, 1-hexene, 1-heptene, 4-methyl-1-pentene, 4-methyl-1-hexene, 5-methyl-1-hexene, 1-octene, 1-nonene, 1-decene, 1-undecene, 1-dodecene, and 1-hexadecene. The linear mono-olefins are preferred, with ethylene, propylene, 1-hexene and 1-octene being highly preferred.

Specific examples of suitable dienes of the general formula:

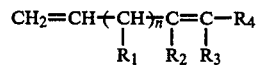

include cis-1,4-hexadiene, trans-1,4-hexadiene, cis-1,4-heptadiene, trans-1,4-heptadiene, 4-methyl-1,4-hexadiene, 4-ethyl-1,4-hexadiene, 4-butyl-1,4-hexadiene, 3-methyl-1,4-hexadiene, 4-methyl-1,4-heptadiene, 4-methyl-1,4-nonadiene, 3,4-dimethyl-1,4-hexadiene, cis-1,4-nonadiene, trans-1,4-nonadiene, 6-phenyl-1,4-hexadiene, 5-phenyl-1,4-hexadiene, 5-p-tolyl-1,4-hexadiene, 4,5-diphenyl-1,4-hexadiene, cis-1,4-octadiene, trans-1,4-octadiene, trans-1,4-decadiene, trans-1,4-dodecadiene, cis-1,4-dodecadiene, trans-1,4-tetradecadiene, cis-1,4-tetradecadiene, 1,5-heptadiene, 1,6-octadiene, and 7-methyl-1,6-octadiene. Preferred dienes include trans-1,4-hexadiene, trans-1,4-heptadiene, and 5-methyl-1,4-hexadiene.

Specific examples of suitable alpha-, omega-polyenes which may be utilized to form butene interpolymers include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,4,9-decatriene, 1,5,9-decatriene, 1,6,9-decatriene, 1,5,9,13,17-octadecapentadiene, 1,9,17-octadecatriene, 1,4,7-octatriene, and the like. Preferred alpha-, omega-polyenes are 1,7-octadiene, 1,9-decadiene, and 1,5,9-decatriene.

As employed in this specification, inherent viscosity is defined as the natural logarithm of the relative viscosity at 30° C. divided by the polymer concentration for a 0.05 to 0.25 percent (W./V.) solution in toluene, chloroform, tetrachloroethylene or other suitable solvent and expressed in units of deciliters per gram (dl./g.). The butene polymers of the present invention have an inherent viscosity of from about 0.5 to about 10.0 dl./g. and preferably from about 1.0 to about 6.0 dl./g.

Coordination catalysts prepared from organometallic-transition metal compounds may be utilized in the present invention in the preparation of butene polymers. These catalysts are conventional and well known to the art and do not constitute a part of this invention. Examples of such catalyst systems include triethylaluminum-vanadium tetrachloride, triethylaluminum-α-titanium trichloride, diethylaluminum chloride-α-titanium tetrachloride. Of course, many other catalysts may be utilized.

The elastomers are optionally used with reclaimed rubber devulcanized by microwave energy and are used with blends of reclaimed rubber devulcanized by conventional methods. The various elastomers include natural or synthetic cis-1,4-polyisoprene, polyalkenylenes, or synthetic elastomers made from monomers selected from the group consisting of conjugated dienes having from 4 to 10 carbon atoms, interpolymers of said dienes (1) among themselves, or (2) with monomers selected from the group consisting of vinyl substituted aromatic hydrocarbon compounds having from 8 to 12 carbon atoms, or combinations thereof. Specific examples of suitable elastomers include natural cis-1,4-polyisoprene rubber such as guayule and Hevea, synthetic cis-1,4-polyisoprene, cis-1,4-polybutadiene, solution or emulsion styrene-butadiene rubber, polypiperylene, poly-2,3-dimethylbutadiene, 3,4-polyisoprene, 1,2-polybutadiene, and the like. The terms cis-1,4-polyisoprene and cis-1,4-polybutadiene imply that these rubbers contain about 70 percent or more of the cis-1,4-structure, and preferably more than 90 percent. The term 3,4-polyisoprene, as used here, implies about 30 percent or more of the 3,4-structure. Likewise, 1,2-polybutadiene denotes about 30 percent or more of the 1,2-structure. Examples of specific interpolymers made from the conjugated dienes include interpolymers of isoprene and butadiene, isoprene and piperylene, 2,3-dimethylbutadiene and piperylene, and the like. The elastomeric interpolymers of the conjugated dienes with the vinyl substituted aromatic compounds will contain from about 2 percent to about 50 percent by weight of the vinyl compound with a desired range being from 5 percent to about 35 percent by weight. A preferred range is from about 15 percent to about 30 percent by weight. Examples of suitable vinyl-substituted aromatic compounds include styrene, alpha-methylstyrene, ortho-, para-, and meta-methyl and ethylstyrenes, and the like. Styrene and alpha-methylstyrene are preferred. Hence, examples of such interpolymers will include those prepared from styrene and butadiene, styrene and isoprene, alpha-methylstyrene and butadiene, and the like.

Polyalkenylenes, according to the present invention, mean homopolymers of cyclomonoolefins, homopolymers of non-conjugated cyclopolyolefins, and interpolymers of cyclomonoolefins with non-conjugated cyclopolyolefins. Typical examples of polyalkenylenes are polypentenylene which is a homopolymer of cyclopentene having from 5 to 99 percent cis and 95 to 1 percent trans configurations of double bonds; polyoctenylene which is a homopolymer of cyclooctene having about 25 to 95 percent cis and 75 to 5 percent trans configurations of double bonds; polyoctadieneylene which is a homopolymer of 1,5-cyclooctadiene having about 25 to 85 percent cis and 75 to 15 percent trans configurations of double bonds; copolymers of cyclopentene and dicyclopentadiene containing from 10 to 40 mole percent dicyclopentadiene; and copolymers of cyclooctene and 1,5-cyclooctadiene containing 10 to 50 mole percent cyclooctadiene.

Generally, the preferred elastomers for practicing the present invention include natural or synthetic cis-1,4-polyisoprene, cis-1,4-polybutadiene, 1,2-polybutadiene, and the copolymers of styrene and butadiene.

The range of the butene polymers is from about 2 to about 30 parts by weight per 100 parts by weight of the elastomer-reclaimed rubber blend. A preferred range is from about 3 to about 27 parts by weight per 100 parts by weight of elastomer-reclaimed rubber blend. The number average molecular weight of the synthetic elastomer may desirably range from about 90,000 to about 500,000 with a more desirable range being from about 100,000 to about 300,000. The number average molecular weight of the butene polymers may desirably range from about 30,000 to about 500,000, with a more desirable range being from about 50,000 to about 300,000.

Reclaimed rubber may be defined as the product resulting from the treatment of scrap vulcanized rubber by the application of mechanical energy, heat, and/or chemical agents, or microwave energy, whereby a substantial regeneration of the rubber compound to its original plastic state is effected, thus permitting the product to be processed, compounded, and vulcanized. The composition of the reclaimed rubber, of course, will vary from batch to batch according to the source of items reclaimed. Generally, when the reclaimed rubber has been devulcanized by conventional methods, for example, heat, mechanical energy, and/or chemical agents (that is, non-microwave reclaiming processes), the amount of the reclaimed rubber used to replace virgin elastomers is usually below 60 parts by weight, that is from about 5 parts by weight to about 60 parts by weight, generally from about 10 to about 50 parts by weight, and desirably from about 15 parts by weight to about 40 parts by weight per 100 parts by weight of the reclaimed rubber and the elastomer. Higher levels, that is, from about 60 parts by weight to 100 parts by weight of the reclaimed rubber devulcanized by conventional methods (that is, non-microwave processes) can be used for products (for example, floor mats and semi-pneumatic tires) not requiring the superior vulcanized properties of virgin elastomers. When the reclaimed rubber has been produced using microwave energy to devulcanize vulcanized scrap rubbers having polar groups therein, the reclaimed rubber may replace up to 100 parts by weight of the virgin elastomer content, that is from about 5 parts by weight to 100 parts by weight, generally from about 20 parts by weight to 100 parts by weight, desirably from about 40 parts by weight to 100 parts by weight, preferably from about 90 parts by weight to 100 parts by weight, and highly preferable from about 98 parts by weight to 100 parts by weight per 100 parts by weight of reclaimed rubber and elastomer. The amount of the butene polymers per 100 parts by weight of the elastomer-reclaimed rubber blend is the same as before, that is, from about 2 to about 30 parts by weight.

Examples of rubbers which can be reclaimed by conventional methods, that is, mechanical energy, heat, and/or chemical agents, include polychloroprene, chlorobutyl rubber, bromobutyl rubber, butyl rubber, nitrile rubber, EPDM, natural or synthetic cis-1,4-polyisoprene, polybutadiene, copolymers of styrene and butadiene (SBR), and the like. The sources are generally naturally discarded products. Thus, rubber hose generally makes a good source of EPDM, discarded inner tubes are a good source of butyl rubber, industrial liners are a good source of polychloroprene, whereas tires are a good source of polybutadiene, as well as polyisoprene and SBR, and industrial belts are a good source of nitrile rubber.

A preferred source of reclaimed rubber for the present invention is vulcanized rubber which has been devulcanized to its original plastic stage by the use of microwave energy. The manner, process, type of microwave energy, amount of such energy, dose rate, frequency, and the like with regard to the microwave energy is set forth in U.S. Pat. No. 4,104,205, to Novotny et al which was granted Aug. 1, 1978, and is hereby fully incorporated by reference. For example, although any conventional microwave generator may be utilized, the frequency is desirably between 915 and 2,450 MHz and between 41 and 177 watt-hours per pound of rubber. The temperature of the rubber will generally vary between 450° F. and 800° F. The rubber to be reclaimed desirably is composed of rubbers having inherent polarity, for example, polychloroprene, nitrile rubber, nitrile rubber-poly(vinyl chloride) blends [30 percent by weight maximum poly(vinyl chloride), and typically about 20 percent poly(vinyl chloride) by weight], bromobutyl rubber, chlorobutyl rubber, and the like, or non-polar rubbers (for example, butyl rubber, EPDM, polybutadiene, natural rubber, synthetic cis-1,4-polyisoprene, etc.), in which polarity has been introduced as the result of some other material compounded into the rubber (for example, carbon black). Examples of other specific vulcanized rubbers which may be devulcanized by the microwave process includes those set forth above herein, that is polyalkenylenes, synthetic elastomers made from monomers of conjugated dienes having from 4 to 10 carbon atoms or interpolymers of said dienes (1) among themselves, or (2) with monomers of vinyl substituted aromatic hydrocarbons having from 8 to 12 carbon atoms.

Sulfur-vulcanized elastomers and elastomer blends containing sufficient polarity reclaimed by the microwave process are devulcanized to materials capable of recompounding and revulcanization to a product having physical properties essentially equivalent to the original vulcanizate. This is generally not true of rubbers reclaimed by the application of mechanical energy, heat and/or chemical agents (that is, conventional reclaiming processes). Naturally, the chemical composition of the reclaimed rubber (e.g., polybutadiene, natural rubber, etc.) will vary according to source of scrap which is reclaimed. Rubbers which can be reclaimed by the microwave process are from the same sources as those set forth for conventionally reclaimed rubbers. Such rubbers are well known to those skilled in the art. Moreover, *The Vanderbilt Rubber Handbook*, R. D. Babbit, Editor, published by The Vanderbilt Co., Inc., Norwalk, Conn. (1978) further defines various rubbers such as EPDM, nitrile rubber, SBR, etc., and is hereby fully incorporated by reference with regard to class and type of suitable rubbers which may be utilized.

Regardless of the amount of reclaimed rubber utilized, the butene polymers may be dispersed into the elastomer according to conventional methods, as set forth above. For example, the butene polymer may be solvent blended with the elastomer, dried, and this blend added to the reclaimed rubber during a Banbury or a mill-mixing operation.

Another method involves the addition of the butene polymer either during or immediately after the microwave reclaiming process. This method is possible since the reclaimed rubber process temperature is considerably above the melting temperatures of the butene polymers.

Any of such methods, or any other method, may utilize more than one type of reclaimed rubber as well as more than one type of elastomer to form the blend. Similarly, more than one butene polymer may be utilized, with the total amount of polymer falling within the above-noted ranges.

As previously noted, the blending of the butene polymers results in green strength improvement which is usually retained throughout extended processing, including milled stocks. The addition of the butene polymers in the amounts set forth above does not effect the gel content, Mooney, or other raw physical properties, except green strength. Physical properties of the vulcanized blends are at least equivalent to those of solely the rubbers utilized in the blend. Additionally, the blends show significantly higher green strength even after extensive milling. This latter behavior is particularly desirable for rubber stocks used for the fabrication of complicated articles such as industrial products and the like. Of course, the blends of the present invention may be used for any heretofore employed purpose such as for tires in either the body or tread, industrial and automotive products, belts, hoses, tank liners, and other industrial uses. A preferred use of reclaimed rubber-elastomer blends is for the manufacture of radial tires, especially truck tires.

Typical or usual compounding ingredients may be added to the blends as during mastication or other steps. Thus, carbon black, zinc oxide, silica, various clays, oils, waxes, or fibers may be utilized along with a host of other compounds such as antioxidants, antiozonants, curing agents, accelerators, processing agents, and the like, as well known and understood by those skilled in the art. Conventional equipment can be utilized for blending the butene polymer with the elastomer as well as for the compounding material. Thus, the butene polymer can be blended with the elastomer-reclaimed rubber composition by mixing in a conventional internal mixer, such as a Banbury, or on a rubber mill, either before or during addition of the desired compounding ingredients. Alternately, suitable compounding ingredients may be added to the reclaimed rubber prior to blending with the elastomer and butene polymer.

According to another concept of the present invention, moldable reclaimed rubber blends are obtained by utilizing as one component thereof, reclaimed rubber which has been devulcanized by microwave energy. The remaining component is a crystalline or semi-crystalline polyolefin. Surprisingly, it has been found that such uncured blends have excellent moldability along with good resistance to attack by aromatic solvents, aliphatic solvents, and fuel/alcohol mixtures.

By a crystalline or semi-crystalline polyolefin, it is meant an alpha-olefin polymer or copolymer selected from the group consisting of polyethylene, polypropylene, copolymers of propylene with 1 to 20 percent by weight of ethylene or alpha-olefin having from 4 to 10 carbon atoms, or copolymers of ethylene with from 1 to 20 percent by weight of an alpha-olefin having from 3 to 10 carbon atoms, or a copolymer of ethylene with from 1 to about 20 percent by weight of vinyl acetate. The percent by weight naturally refers to the amount of that component based upon the total weight of the copolymer. When copolymers of ethylene or propylene are utilized, a preferred weight percentage of the other alpha-olefin is from about 5 percent to about 15 percent by weight. Similarly, in the case when copolymers of ethylene with vinyl acetate are utilized, the preferred range of vinyl acetate in the copolymer is about 5 percent to about 15 percent by weight. The molecular weight of the polyolefin ranges from about 10,000 to about 300,000. Of the various copolymers, copolymers of propylene with ethylene or butene are desirable. However, polyethylene and polypropylene are preferred.

The amount of the polyethylene or polypropylene, or copolymer, or combination thereof ranges from about 20 parts by weight to about 60 parts by weight and preferably from about 25 parts by weight to about 50 parts by weight per 100 parts by weight of the reclaimed rubber-polyolefin blend.

By crystalline or semi-crystalline, it is meant that the olefin polymers have definite melting temperatures, for example in the range of 80° C. to about 235° C. It is also meant that the olefin polymer has crystallinity which can be observed using a polarizing microscope.

The blend of the polyethylene and/or polypropylene (and copolymers referred to above) with the microwave reclaimed rubber yield readily moldable uncured products which are resistant to attack by solvents, for example, aromatic solvents, aliphatic solvents and fuel/alcohol mixtures. Thus, such blends can be used as gaskets, sealants, fuel lines, tank linings, and the like. By the term "readily moldable," it is meant that the material can be shaped by conventional molding techniques, for example injection, compression, transfer, extrusion, and the like, and retains the molded shape after cooling. The material can be molded into items having good surface finish and very low shrinkage. Materials flow readily when molded above the melting temperatures of the polyolefins used.

Other advantages of the blend include its low cost, easy control of the distortion temperature as well as the low temperature properties by the choice of the polyolefin component, softening point and crystallinity of the polyolefin; the elimination of a curing step, and the ability to utilize the high temperatures of the reclaiming process to blend during a post-reclaiming step. Still another advantage is the use of scrap rubber, that is, commonly discarded items to produce useful products. Still another advantage is the fact that it is unnecessary to incorporate a reinforcing filler since carbon black is generally already present in the reclaimed rubber component of the blend.

The blending of the polyolefin with the reclaimed rubber can be carried out according to many conventional methods, the only requirement is that the polyolefin is dispersed in the blend. For example, blending can be accomplished by mixing with an internal mixer, extruder, or on a rubber mill at a temperature above the softening temperatures of the particular polyolefins used. Additionally, blending can be accomplished during or directly following the application of microwave energy to devulcanize the scrap rubber, that is while the reclaimed rubber is still hot, the polyolefin may be added thereto.

Typical and conventional compounding agents may be added to the blends before or during the blending step. Thus, zinc oxide, silica, clay, oils, waxes, or fibers may be utilized along with a host of other compounds such as antioxidants, antiozonants, curing agents, accelerators, processing aids, and the like, as well known and understood by those skilled in the art. Although carbon black is usually contained in the reclaimed rubber, if desired, additional amounts may be added.

Typical examples of olefin polymers and copolymers include the following: (1) polyethylenes having densities from about 0.91 to about 0.97 grams per cubic centimeter commercially available under a great variety of tradenames, for example Alathon from E. I. duPont de Nemours and Co. Inc., Dylan from ARCO/Polymers Inc., Petrothene from U.S. Industrial Chemicals Co., and the like; (2) polypropylenes having densities from about 0.89 to about 0.91 grams per cubic centimeter which are available commercially under a variety of tradenames, for example Moplen from Novamont Corp., Tenite from Eastman Chemical Products, Inc., and the like; (3) ethylene/vinyl acetate copolymers containing about 5 percent to about 15 percent vinyl acetate and having densities for the copolymer of about 0.92 to about 0.95 grams per cubic centimeter, commercially available under many tradenames, for example, Ultrathene from U.S. Industrial Chemicals Co., EVA from E. I. duPont de Nemours and Co. Inc., and the like; (4) copolymers of propylene with from about 1 percent to about 20 percent by weight of an alpha-olefin having from 4 to 10 carbon atoms and having densities for the copolymer of about 0.90 to about 0.92 grams per cubic centimeter, commercially available from different companies under various tradenames, for example Profax SA861 and SB-451 from Hercules Inc., and the like.

The invention will be more fully understood by the following examples:

PREPARATION OF BUTENE POLYMER

The following examples describe the preparation of a copolymer of 1-butene and 1-hexene; 1-hexene (minimum purity of 96 percent) and n-heptane were dried separately by passing through an 18-inch silica gel column. 1-butene (minimum purity of 99 percent) was used directly from a cylinder and bubbled into a known quantity of n-heptane in a 2-necked flask equipped with a dry-ice condenser. The amount of butene dissolved was determined from increase in the weight of the flask. To this solution, an appropriate amount of dried hexene was added so that the molar ratio of butene to hexene was 85:15. The total monomer concentration was adjusted to about 25 weight percent by the addition of more heptane. The entire mixture was carefully sparged with high purity nitrogen.

The polymerization catalyst, α-TiCl$_3$/Et$_2$AlCl, was prepared in situ under nitrogen by the addition of a 1.5 molar Et$_2$AlCl solution in heptane followed by 1.16 molar α-TiCl$_3$ (contains 0.33 molar AlCl$_3$) suspension in heptane. The molar ratio of Et$_2$AlCl to TiCl$_3$ was about 1.5.

For instance, a solution of 448 grams of 1-butene and 120 grams of hexene in 2,000 ml. heptane was polymerized under nitrogen at 25° C. with a catalyst prepared from 6 ml. of 1.16 molar α-TiCl$_3$ suspension in heptane and 7.2 ml. of 1.5 molar Et$_2$AlCl solution in heptane. After 120 hours, the polymerized mass was precipitated in excess methanol containing a phenolic antioxidant. The dried copolymer was obtained in 91 percent conversion. Its inherent viscosity was 4.1 dl./g.

In a similar manner, a solution of 56 grams of butene in 250 ml. of heptane was polymerized with a catalyst prepared from 1.0 ml. of 1.16 molar suspension of α-TiCl$_3$ and 1.20 ml. of 1.5 molar Et$_2$AlCl solution in heptane. The polymerization was allowed to proceed at room temperature for 72 hours, the contents being shaken. A suspension of polybutene was obtained. After precipitation in excess methanol, a crystalline, white powdery material was obtained in 72 percent conversion by drying in a vacuum oven. It gave endothermic peaks at 98° C. and 121° C. by differential thermal analysis using a calorimetric attachment.

The following examples will further describe the nature of the invention.

The following materials were utilized in the examples:

| | |
|---|---|
| 90/10 butene/hexene copolymer, inherent viscosity 4.6 dl./g. | |
| 95/5 butene/hexene copolymer, inherent viscosity 5.1 dl./g. | |
| Reclaimed rubber #1: (scrap inner tubes) | contains about 70 weight percent butyl rubber and 30 weight percent EPDM. Reclaimed using the microwave process cited in U.S. Pat. No. 4,104,205. |
| Reclaimed rubber #2: (scrap inner tubes) | contains about 80 weight percent butyl rubber and about 20 weight percent EPDM. Reclaimed by the usual method, using chemical, thermal, and mechanical operations. |
| Reclaimed rubber #3: (tire scrap) | consists of approximately 30 percent natural rubber, 35 percent SBR, and 35 percent polybutadiene (by mass spectrometer analysis). This material was reclaimed by the conventional method (like #2). |
| Reclaimed rubber #4: (tire scrap) | similar to the reclaim #3 in composition (25 percent polybutadiene, 15 percent natural rubber, 60 percent SBR), but reclaimed using the microwave process. (Note: this composition was not as polar as the reclaim #1 and thus is not completely devulcanized.) |

Masticated controls and blends were treated exactly alike, using 100 parts by weight reclaimed rubber as follows:

| Material | Parts By Weight |
|---|---|
| Reclaimed rubber #1, #2, #3, or #4 | 100 |
| Zinc oxide | 2.5 |
| Stearic Acid | 1 |
| Total | 103.5 |

Blends were prepared from reclaimed rubber and butene copolymer, as follows:

| Material | Parts By Weight |
|---|---|
| Reclaimed rubber #1, #2, #3, or #4 | 100 |
| Butene copolymer | 5–25 |
| Zinc oxide | 2.5 |
| Stearic acid | 1 |
| Total | 108.5–128.5 |

Both the masticated controls and the blends were mixed in a Brabender Plastograph (equipped with a Banbury Head), 50 RPM, 5½ minutes, 240° F.

TABLE I
Masticated Controls and Blends with Butene/Hexene Copolymers

| Reclaimed Rubber[1] | Butene Copolymer[2] | Amt. (parts by wt.) | TENSILE STRENGTH STRESS (psi) | ELONGATION (percent) |
|---|---|---|---|---|
| #1 | none | — | 28 | 870 |
| #1 | 90/10 | 5 | 131 | 170 |
| #1 | 90/10 | 10 | 179 | 140 |
| #2 | none | — | 168 | 510 |
| #2 | 90/10 | 10 | 298 | 100 |
| #3 | none | — | 45 | 240 |
| #3 | 95/5 | 10 | 97 | 190 |
| #4 | none | — | 199 | 110 |
| #4 | 90/10 | 10 | 303 | 80 |

[1]Reclaim materials as defined under MATERIALS.
[2]Copolymers defined under MATERIALS.

It is apparent from Table I that the addition of butene copolymer resulted in improved green strength as specifically noted by an increase in tensile strength, that is, stress at break.

Data with regard to reclaimed rubber blended with elastomers, as well as the butene-type polymers are set forth in Tables II and III.

TABLE II
Two Component Blends of Natsyn 2200 and Reclaim Rubber (Controls)

| Natsyn 2200 (parts by weight) | Reclaimed Rubber Type | Reclaimed Rubber (parts by weight) | Tensile Strength Stress (psi) | Elongation (%) |
|---|---|---|---|---|
| 80 | #1 | 20 | 20 | 2400 |
| 80 | #4 | 20 | 14 | 1200 |

TABLE III

Three Component Blends Containing Natsyn 2200, Reclaimed Rubber, and Butene/Hexene Copolymer

| Natsyn 2200[1] (parts by wt.) | Reclaimed Rubber[2] Type | (parts by weight) | Copolymer[3] (parts by weight) | Tensile Strength Stress (psi) | Elongation (%) |
|---|---|---|---|---|---|
| 75 | #1 | 25 | 25 | 230 | 150 |
| 75 | #4 | 25 | 25 | 323 | 150 |

[1]Natsyn 2200 is a commercially available cis-1,4-polyisoprene from The Goodyear Tire and Rubber Company
[2]Reclaimed rubber #1 is reclaimed by the microwave method and is the same material as used previously (70 weight percent butyl rubber and 30 weight percent EPDM). Reclaimed rubber #4 is also reclaimed by the microwave method and is the same as described before (tire scrap).
[3]The copolymer used here is a 90/10 butene/hexene copolymer, inherent viscosity 4.6 dl./g.

As is apparent from the data in Tables II and III, the addition of butene polymers improved the green strength of the reclaimed rubber-elastomer blends.

With regard to the blend of reclaimed rubber, which had been devulcanized using microwave energy, with polyethylene, polypropylene, olefin polymers, or combinations thereof, the following tables will serve to better illustrate the invention.

Blends shown in Table IV were prepared by mixing in a Brabender Plastograph (equipped with a Banbury Head) for 8 minutes at 130° C., as follows:

| Material | Parts By Weight |
|---|---|
| Reclaimed rubber #1 | 50 |
| Microthene 91010 | 50 |
| Zinc oxide | 5 |
| Tetramethylthiuram disulfide | 0.4 |
| Mercaptobenzothiazole | 0.3 |
| Sulfur | 1.0 |
| Total | 106.7 |

The control stock was treated in the same manner, using 100 parts by weight of reclaimed rubber, as follows:

| Material | Parts by Weight |
|---|---|
| Reclaimed rubber #1 | 100 |
| Zinc oxide | 5 |
| Tetramethylthiuram disulfide | 0.8 |
| Mercaptobenzothiazole | 0.6 |
| Sulfur | 1.1 |
| Total | 107.5 |

Swelling data shown in Table IV was obtained by allowing a 1 gram molded strip to swell in the indicated solvent for the specified time, after which the increase in volume was measured. This was converted to percent swell by:

$$\left[\frac{\text{(increase in volume after swelling)}}{\text{(unswollen volume)}}\right] \times 100 = \% \text{ swell}$$

TABLE IV

SWELLING DATA ON RECLAIMED RUBBER #1* - POLYETHYLENE BLEND

| MICROTHENE 91010[1] (parts by weight) | CURE CONDITIONS Time (min.) | Temp. (°C.) | Solvent (Type) | SWELLING DATA AT ROOM TEMPERATURE % Swell (24 hours) | % Swell (140 hours) |
|---|---|---|---|---|---|
| None | 35 | 160 | Toluene | 228 | — |
| None | 35 | 160 | Fuel/Alcohol[2] | 138 | 142 |
| 50 | No Cure | | Toluene | 18 | — |
| 50 | 35 | 160 | Toluene | 18 | — |
| 50 | No Cure | | Cyclohexane | 17 | — |
| 50 | 35 | 160 | Cyclohexane | 21 | — |
| 50 | 35 | 160 | Fuel/Alcohol | 19 | 27 |

[1]Microthene 91010 is a tradename for a high density polyethylene from U.S. Industrial Chemicals Co. (35 mesh powder).
[2]Fuel/Alcohol is 56 percent isooctane, 24 percent toluene, and 20 percent ethyl alcohol
*obtained from inner tube scrap by microwave devulcanization It is apparent from the data in Table IV that the reclaimed rubber control which did not contain any polyethylene had a very high percent swell (i.e., poor resistance to swelling), in spite of the fact that it was fully cured, whereas the reclaimed rubber-polyethylene blends had very low swelling (i.e., very good resistance to swelling) in all types of solvents, whether cured or not.

Blends shown in Table V were prepared in a Brabender Plastograph (equipped with a Banbury Head) by mixing for 8-10 minutes at 100°-140° C., as follows:

| Material | Parts By Weight |
|---|---|
| Reclaimed rubber #1 or #4 | 40-50 |
| Polyolefin | 60-50 |
| Total | 100 |

Blends were injection molded using a Frohring Miniinjector at 40 to 60 pounds per square inch line pressure.

TABLE V

MOLDING COMPOUNDS FROM UNCURED MICROWAVE RECLAIMED RUBBER - POLYOLEFIN BLENDS

| Reclaimed Rubber Type[1] | POLYOLEFIN Type[1] | (parts by weight) | POLYOLEFIN Type[1] | (parts by weight) | INJECTION TEMP. (°C.) | MOLDING PROPERTIES[3] Flow | Surface |
|---|---|---|---|---|---|---|---|
| Tire Scrap | MT | 40 | LDPE | 10 | 130 | Good | Fair |
| Tire Scrap | MT | 40 | LDPE | 20 | 130 | Good | Good |
| Tire Scrap | MT | 50 | — | — | 100 | Very Good | Good |
| Tube Reclaim | MT | 50 | — | — | 130 | Very Good | Excellent |
| Tube Reclaim | EVA | 50 | — | — | 100 | Very Good | Excellent |
| Tube Reclaim | PP | 50 | — | — | 150 | Good | Very Good |

TABLE V-continued
MOLDING COMPOUNDS FROM UNCURED MICROWAVE RECLAIMED RUBBER - POLYOLEFIN BLENDS

| Reclaimed Rubber Type[1] | POLYOLEFIN Type[1] | POLYOLEFIN (parts by weight) | Type[1] | (parts by weight) | INJECTION TEMP. (°C.) | MOLDING PROPERTIES[3] Flow | Surface |
|---|---|---|---|---|---|---|---|
| Tube Reclaim | PP | 40 | LDPE | 10 | 150 | Excellent | Excellent |

[1]MT is Microthene 91010 (high density polyethylene), U.S. Industrial Chemical Co. tradename.
EVA is Ultrathene MU763-00 (ethylene/vinyl acetate copolymer), U.S. Industrial Chemical Co. tradename.
PP is ProFax SA861 (propylene copolymer), Hercules Inc. tradename.
LDPE is low density, low molecular weight polyethylene powder.
Tube reclaim is as set forth in Table I (reclaimed rubber #1).
Tire scrap is devulcanized by microwave radiation and since it is non-polar, is only partially devulcanized (reclaimed rubber #4, defined in Table I).
[2]Barrel temperature of injection molding machine.
[3]Flow is judged by how easily material fills mold and definition of intricate parts. Surface is judged by smoothness and gloss of molded part.

As is apparent from Table V, good to excellent mold flow and surface definition were obtained with the reclaimed rubber-polyolefin blends. The reclaimed rubber alone, that is, without the addition of a polyolefin component, would not flow into molds at the pressures used to mold the reclaimed rubber-polyolefin blends.

While the best mode and various embodiments have been described in detail, it is obvious that various changes and modifications may be made therein without departing from the spirit or scope of the invention. Therefore, for the true scope of the invention, reference should be had to the appended claims.

What is claimed is:

1. A reclaimed rubber-polyolefin composition, comprising:
   from about 20 parts by weight to about 60 parts by weight of a crystalline or semi-crystalline polyolefin, said polyolefin selected from the group consisting of polyethylene, polypropylene, copolymers of ethylene with about 1 percent to about 20 percent by weight of an alpha-olefin having from 3 to 10 carbon atoms, copolymers of propylene with about 1 percent to about 20 percent by weight of ethylene or alpha-olefins having from 4 to 10 carbon atoms, a copolymer of ethylene with from about 1 percent to about 15 percent by weight of vinyl acetate, and combinations thereof:
   from about 40 parts by weight to about 80 parts by weight of reclaimed rubber, said reclaimed rubber made from vulcanized rubber which has been devulcanized by microwave energy, the total amount of said polyolefin and said reclaimed rubber being 100 parts by weight, said reclaimed rubber selected from the group consisting of polychloroprene, chlorobutyl rubber, bromobutyl rubber, nitrile rubber, nitrile rubber-poly(vinyl chloride) blends having up to 30 percent by weight of poly(vinyl chloride), butyl rubber, EPDM, natural or synthetic cis-1,4-polyisoprene, polyalkenylenes, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms; and combinations thereof.

2. A reclaimed rubber-polyolefin composition according to claim 1, wherein the softening temperature of said polyolefin is within the range of about 80° C. to about 235° C.

3. A reclaimed rubber-polyolefin composition according to claim 2, wherein the polyolefin is polyethylene or polypropylene and wherein the amount of said polyethylene or said polypropylene ranges from about 25 parts by weight to about 50 parts by weight and wherein the amount of said reclaimed rubber ranges from about 50 parts by weight to about 75 parts by weight.

4. A reclaimed rubber-polyolefin composition according to claim 2, wherein said reclaimed rubber is selected from the group consisting of natural rubber, synthetic cis-1,4-polyisoprene, cis-1,4-polybutadiene, 1,2-polybutadiene, a copolymer of styrene and butadiene, butyl rubber, EPDM, and combinations thereof.

5. A reclaimed rubber-polyolefin composition according to claim 2, 3 or 4, wherein said composition yields readily moldable products which are resistant to solvents and wherein said products can be used as gaskets, hoses, liners, automotive parts, and the like.

6. A process for producing a reclaimed rubber-polyolefin blend comprising:
   obtaining from about 20 parts by weight to about 60 parts by weight of at least one crystalline or semi-crystalline polyolefin, said polyolefin selected from the group consisting of polyethylene, polypropylene, copolymers of ethylene with from about 1 percent to about 20 percent by weight of an alphaolefin having from 3 to 10 carbon atoms, copolymers of propylene with about 1 percent to about 20 percent by weight of ethylene or alpha-olefins having from 4 to 10 carbon atoms, a copolymer of ethylene with from about 1 percent to about 15 percent by weight of vinyl acetate, and combinations thereof:
   adding and mixing with said polyolefin about 40 parts by weight to about 80 parts by weight of reclaimed rubber, said reclaimed rubber made from vulcanized rubber which has been produced by devulcanizing scrap rubber using microwave energy, the total amount of said polyolefin and said reclaimed rubber being 100 parts by weight, said reclaimed rubber selected from the group consisting of polychloroprene, chlorobutyl rubber, bromobutyl rubber, nitrile rubber, nitrile rubber-poly(vinyl chloride) blends having up to 30 percent by weight of poly (vinyl chloride) blends, butyl rubber, EPDM, polyalkenylenes, natural or synthetic cis-1,4-polyisoprene, elastomers made from monomers selected from the group consisting of conjugated dienes having from 4 to 10 carbon atoms, interpolymers of said dienes (1) among themselves, or (2) with monomers selected from the group consisting of vinyl substituted hydrocarbon compounds having from 8 to 12 carbon atoms; and combinations thereof.

7. A process according to claim 6, wherein the softening temperature of said polyolefin is within the range of about 80° C. to about 235° C.

8. A process according to claim 7, wherein the polyolefin is polyethylene or polypropylene and wherein the amount of said polyethylene or said polypropylene ranges from about 25 parts by weight to about 50 parts by weight with the amount of said reclaimed rubber ranging from about 50 parts by weight to about 75 parts by weight.

9. A process according to claim 7, wherein the molecular weight of said polyethylene or said polypropylene ranges from about 10,000 to about 300,000 and wherein said reclaimed rubber is selected from the group consisting of natural rubber, synthetic cis-1,4-polyisoprene, cis-1,4-polybutadiene, 1,2-polybutadiene, a copolymer of styrene and butadiene, butyl rubber, EPDM, and combinations thereof.

10. A process according to claim 7, wherein said mixing occurs at a temperature above the softening temperature of said polyolefins.

11. A process according to claim 7, including mixing said reclaimed rubber and said polyolefin immediately following devulcanization by microwave energy.

12. A process according to claims 6, 7, 8, 9, 10, or 11, including molding said blends into solvent-resistant products such as gaskets, hose, liners, automotive parts, and the like.

* * * * *